United States Patent

Neal et al.

[11] Patent Number: 6,052,180
[45] Date of Patent: Apr. 18, 2000

[54] APPARATUS AND METHOD FOR CHARACTERIZING PULSED LIGHT BEAMS

[75] Inventors: Daniel R. Neal; Ron R. Rammage, both of Tijeras; Darrell J. Armstrong; William T. Turner, both of Albuquerque, all of N.Mex.

[73] Assignee: WaveFront Sciences, Inc., Albuquerque, N.Mex.

[21] Appl. No.: 09/244,860

[22] Filed: Feb. 5, 1999

Related U.S. Application Data

[63] Continuation-in-part of application No. 09/111,620, Jul. 7, 1998, Pat. No. 5,936,720, which is a continuation-in-part of application No. 08/678,019, Jul. 10, 1996, Pat. No. 5,864,381.
[60] Provisional application No. 60/051,863, Jul. 7, 1997, and provisional application No. 60/074,337, Feb. 6, 1998.

[51] Int. Cl.[7] .................................................. G01J 1/00
[52] U.S. Cl. ..................... 356/121; 250/201.9; 250/208.1
[58] Field of Search ................................. 356/121, 106, 356/127; 351/200, 246, 205, 247; 250/201.9, 208.1

[56] References Cited

U.S. PATENT DOCUMENTS

5,493,391  2/1996  Neal et al. .............................. 356/121

*Primary Examiner*—Hung Xuan Dang
*Attorney, Agent, or Firm*—Jones Volentine, L.L.P.

[57] ABSTRACT

An apparatus and method for characterizing a pulsed energy beam with a two-dimensional wavefront sensor. The data acquisition is synchronized with the output of the beam from the pulsed source, so that a beam characterization, including phase, can be determined in a single pulse.

22 Claims, 6 Drawing Sheets

APPARATUS AND METHOD FOR CHARACTERIZING PULSED LIGHT BEAMS

CROSS-REFERENCE TO RELATED APPLICATIONS

This application is a continuation-in-part of U.S. patent application Ser. No.09/111,620 entitled "Beam Characterization by Wavefront Sensor" to Daniel R. Neal, et al. filed Jul. 7, 1998 now U.S. Pat. No. 5,936,720, which is a continuation-in-part of application Ser. No. 08/678,019, filed Jul. 10, 1996, now U.S. Pat. No. 5,864,381, entitled "Automatic Pupil Remapping with Binary Optics", to Daniel R. Neal, et al., issued on Jan. 26, 1999 and which claims the benefit of U.S. Provisional Patent Application Ser. No. 60/051,863, entitled "Beam Characterization by Wavefront Sensor", to Daniel R. Neal, et al., filed on Jul. 7, 1997, and claims benefit of U.S. Provisional Patent Application Ser. No. 60/074,337, entitled "Apparatus and Method for Measuring Phase and Amplitude of Pulsed Lasers" to Daniel R. Neal et al., filed on Feb. 6, 1998, all of which are hereby incorporated by reference in their entirety for all purposes.

BACKGROUND OF THE INVENTION

1. Field of the Invention

The present invention relates to methods and apparatuses for characterization of a pulsed light beam.

2. Description of Related Art

In many instances where a laser beam is needed, it is important to know something about the laser beam quality. The beam quality affects how the beam will propagate, as well as how tightly it will focus. Unfortunately, beam quality is a somewhat elusive concept. Numerous attempts have been made to define beam quality, stretching back almost to the invention of the laser. In practice, any one of these measures will have some flaw in certain situations, and many different measures are often used. Among these is the $M^2$ parameter (space-beamwidth product), Strehl ratio, root-mean-squared (RMS) wavefront error and power-in-the-bucket.

The irradiance (or intensity) and phase distribution of a laser beam are sufficient for determining how the beam will propagate or how tightly it can be focused. Most of the beam quality measurements rely on characterizing the beam from only the irradiance distribution, since obtaining this is a comparably straightforward process. However, if both the irradiance and phase distribution could be obtained simultaneously, then all the information would be available from a single measurement.

In general, phase is measured with an interferometer. Interferometers are sensitive instruments that have been extensively developed. Interferometers can be configured in a shearing or filtered Mach-Zehnder arrangement to generate the desired information about the irradiance and phase distribution of a light beam. Unfortunately, these systems rapidly become complex, and are slow, unwieldy, sensitive to alignment, as well as being expensive. Other configurations for measuring wavefronts, such as a spatially varying transmittance ramp filter to divide light described in U.S. Pat. No. 4,690,555 to Ellerbroek, also require two entire separate sensors to spatially resolve the slope across the full aperture for a two-dimensional image. Such a requirement similarly adds complexity and expense.

A Shack-Hartmann wavefront sensor is an alternative method for measuring both irradiance and phase. Since at least 1971, such sensors have been developed by the military for defense adaptive optics programs. This sensor is a simple device that is capable of measuring both irradiance and phase distributions in a single frame of data. The advent of micro-optics technology for making arrays of lenses has allowed these sensors to become much more sophisticated in recent years. In addition, advances in charge coupled device (CCD) cameras, computers and automated data acquisition equipment have brought the cost of the required components down considerably. With a Shack-Hartmann wavefront sensor, determination of the irradiance and phase of a beam is relatively straightforward. This allows not only the derivation of various beam quality parameters, but also the numerical propagation of the sampled beam to another location, where various parameters can then be measured.

The $M^2$ parameter has become a commonly used parameter to generally describe near-Gaussian laser beams. It is especially useful in that it allows a prediction of the real beam spot size and average irradiance at any successive plane using simple analytic expressions. This allow system designers the ability to know critical beam parameters at arbitrary planes in the optical system. Unfortunately, measuring $M^2$ is somewhat difficult. To date, obtaining $M^2$ has generally required measurements of propagation distributions at multiple locations along the beam path. Although attempts have been made to obtain this parameter in a single measurement, these attempts still suffer from the need to make simultaneous measurements at more than one location. The present invention permits calculation of this parameter of a pulsed light source using only a single measurement at a single location.

The following references relate to development of the present invention: A. E. Siegman, "New developments in laser resonators", SPIE Vol. 1224, Optical Resonators (1990), pp. 2–14; H. Weber, "Some historical and technical aspects of beam quality", Opt. Quant.Elec. 24 (1992), S861–S864; M. W. Sasnett, and T. F. Johnston, Jr., "Beam characterization and measurement of propagation attributes", SPIE Vol. 1414, Laser Beam Diagnostics (1991), pp. 21–32; D. Malacara, ed., Optical Shop Testing, John Wiley & Sons, Inc., 1982; D. Kwo, G. Damas, W. Zmek, "A Hartmann-Shack wavefront sensor using a binary optics lenslet array", SPIE Vol. 1544, pp. 66–74 (1991); W. H. Southwell, "Wavefront estimation from wavefront slope measurements", JOSA 70 (8), pp.993–1006 (August, 1980); J. A. Ruff and A. E. Siegman, "Single-pulse laser beam quality measurements using a CCD camera system", Appl. Opt., Vol.31, No.24 (Aug. 20, 1992) pp.4907–4908; Gleb Vdovin, LightPipes: beam propagation toolbox, ver. 1.1, Electronic Instrumentation Laboratory, Technische Universiteit Delft, Netherlands, 1996; General Laser Analysis and Design (GLAD) code, v. 4.3, Applied Optics Research, Tucson, Ariz., 1994; A. E. Siegman, "Defining the Effective Radius of Curvature for a nonideal Optical Beam", IEEE J. Quant.Elec., Vol.27, No.5 (May 1991), pp. 1146–1148; D. R. Neal, T. J. O'Hern, J. R. Torczynski, M. E. Warren and R. Shul, "Wavefront sensors for optical diagnostics in fluid mechanics: application to heated flow, turbulence and droplet evaporation", SPIE Vol.2005, pp. 194–203 (1993); L. Schmutz, "Adaptive optics: a modern cure for Newton's tremors", Photonics Spectra (April 1993); and D. R. Neal, J. D. Mansell, J. K Gruetzner, R. Morgan and M. E. Warren, "Specialized wavefront sensors for adaptive optics", SPIE Vol. 2534, pp. 338–348 (1995).

The present invention is of a wavefront sensor that is capable of obtaining detailed irradiance and phase values from a single measurement. This sensor is based on a microlens array that is built using micro optics technology to provide fine sampling and good resolution. With the sensor, $M^2$ can be determined. Because the full beam irradiance and phase distribution can be predicted anywhere along the beam. Using this sensor, a laser can be completely characterized and aligned. The user can immediately tell if the beam is single or multi-mode and can predict the spot size, full irradiance, and phase distribution at any plane in the optical system. The sensor is straightforward to use, simple, robust, and low cost.

Thus, as noted above, the measurement of the phase and intensity of light beams is important for understanding their characteristics, propagation, for comparing the performance of different systems, and for predicting their characteristics at successive planes. There are many different methods for measuring the intensity distribution of a light beam, while measurement of the phase distribution is much more difficult. These difficulties increase when a pulsed light beam is to be characterized. Some existing instruments can make measurements of a series of light beam pulses assuming that the pulse-to-pulse variations are minimal. However, these very pulse-to-pulse variations are often of interest. Thus, to make these measurements, the phase and intensity of the laser must be measured in a single pulse.

The Shack-Hartmann wavefront sensor has been applied to laser phase measurement for several years. It has also recently been applied to measurement of laser beam intensity profile and beam quality in a single measurement, as disclosed in the '620 application. The Shack-Hartmann wavefront sensor has a number of advantages for phase measurement, including the ability to obtain all of the needed information for measurement of intensity and phase in a single measurement. However, the use of Shack-Hartmann wavefront sensors has not been applied to the intensity and phase measurement of pulsed light beams.

While some beam profilers have been developed for measuring pulsed laser beam intensity, these beam profilers do not measure the phase of the light. Since only the intensity of the light is measured, they are measuring a physically different quantity, and therefore are not sufficient for the measurement noted above.

SUMMARY OF THE INVENTION

The present invention is therefore directed to an apparatus and method of characterizing a pulsed beam which substantially overcomes one or more of the problems due to the limitations and disadvantages of the related art.

The present invention is of a method and apparatus for characterizing a pulsed light beam (preferably a laser), including a wavefront sensor having a lenslet array and directing the pulsed beam through the sensor. In the preferred embodiment, the wavefront sensor is a Shack-Hartmann wavefront sensor. Wavefront slope and irradiance (preferably at a single location along the beam) are measured, wavefront slope distribution is integrated to produce wavefront or phase information. By synchronizing the data acquisition with the pulse, this integration takes place substantially only over the duration of the pulse. Thus, the required information may be collected over a single pulse. A space-beamwidth product may then be calculated (preferably by, as set forth in the '620 application, the gradient method, the curvature removal method, or the Fourier propagation method). A detector array is employed, such as a charge coupled device (CCD) camera, a charge inductive device (CID) camera, or a CMOS camera, rigidly mounted behind the wavefront sensor, ideally at the focal point of the lenslet array.

A primary object of the present invention is to provide pulsed beam characterization using only a single measurement at a single location, which is also the primary advantage of the invention.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF THE PREFERRED EMBODIMENTS

The present invention is directed to the application of wavefront sensors to the measurement of a pulsed laser beam in a single pulse. This is accomplished by electronically synchronizing the various components of the wavefront sensor so that data are acquired in synchronization with the laser pulse to be measured.

Wavefront Sensors Generally

Figure 2:
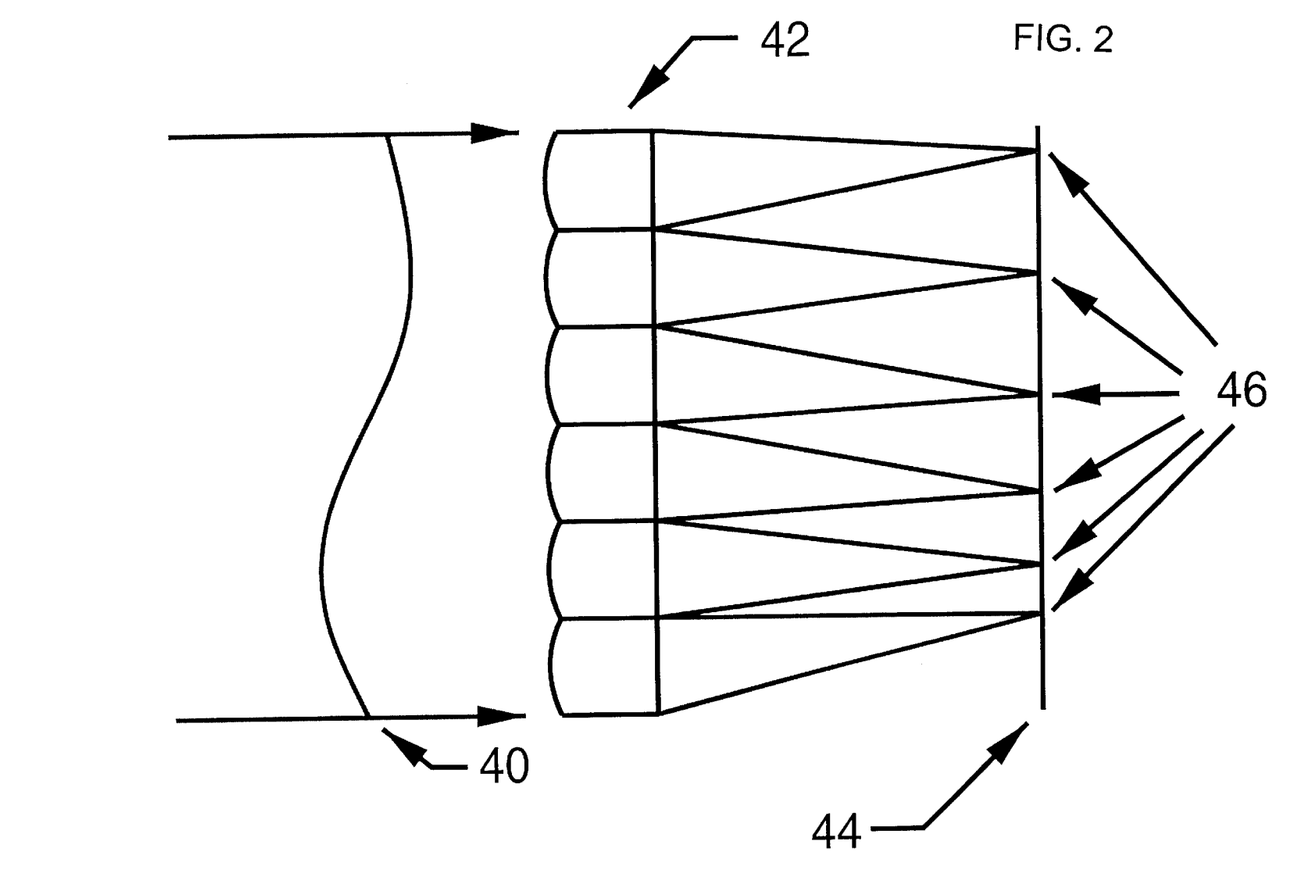
FIG. 2 is a schematic diagram of a Shack-Hartmann sensor.

Before discussing the details of the present invention, a brief description of an example of a wavefront sensor to be used in connection with the present invention will be presented in connection with FIG. 2. FIG. 2 is a schematic diagram of the basic elements of a Shack-Hartmann wavefront sensor for use as a wavefront sensor in accordance with a preferred embodiment of the present invention. A portion of an incoming wavefront 40 from the light source is incident upon a lenslet array 42, which may be either a one-dimensional or a two-dimensional array. The lenslet array 42 dissects the incoming wavefront 40 into number of small samples.

The locations of a focal spot 44 of each of the lenslets is related to the incoming wavefront slope over the lenslet. By integrating these measurements over the aperture, the wavefront or phase distribution can be determined. Because the energy focused by each lenslet is also easily determined, this allows a complete measurement of the irradiance and phase distribution of the beam. Furthermore, all the information is obtained in a single measurement. Knowing the compete scalar filed of the beam allows the detailed prediction of the actual beam's characteristics along its propagation path. In particular, the space-beamwidth product, $M^2$, can be obtained in a single measurement. The irradiance and phase information can be used in concert with information about other elements in the optical train to predict the beam size, shape, phase and other characteristics anywhere in the optical train. For purposes of the specification and claims, "characterization" means using information gathered about an energy beam to predict characteristics of the beam at other planes or times, including, but not limited to, size, shape, irradiance and phase, anywhere in the train of the beam.

The smaller the lenslet, the higher the resolution of the sensor. However, the spot size from a small lenslet leads to a short focal length, which in turn leads to lower sensitivity. Thus, these two parameters must be balanced in accordance with desired measurement performance. Extremely low noise 10–12 bit cameras now available, which aid in increasing the sensitivity of the overall wavefront sensor, allow this balance to be achieved. The dynamic range of the camera is also important in the wavefront sensor design, since the dynamic range affects the accuracy of determination of the irradiance distribution.

Accurate wavefront slope measurements also require that the lenslet array be located a precise, known distance from the detector. There are a number of ways to achieve mehanically rigid, precision spacing. This spacing must be precisely and rigidly controlled, and must be adjusted through calibration to a known, predetermined value. Therefore, a way for positioning, measuring, and adjusting this lenslet position is needed. Such control of the lenslet position is disclosed in detail in the '620 application.

Each sample forms a focal spot 44 on a detector 46. The detector 46 preferably is a low noise, high pixel count charge coupled device (CCD) camera, e.g., SMD-2K manufactured by Silicon Mountain Designs. The processor 30 performs centroid estimation to determine positions of the focal spots. A position of a focal spot depends upon the average wavefront slope incident on the lenslet. By integrating these measurements over the laser aperture, the wavefront or phase distribution can be determined. While previous wavefront sensors could adequately characterize a cw beam, the acquisition of the energy of a pulsed beam with these system was erratic and unreliable.

Overview of the Preferred Embodiment

As noted above, in accordance with the present invention, the wavefront sensor is used to characterize a pulsed light beam in a single measurement. In accordance with the present invention, this is accomplished by electronically synchronizing the various components of the wavefront sensor so that the data is acquired in synchronization with the pulse to be characterized. Knowing the complete scalar field of the pulsed beam allows a detailed prediction of the actual pulsed beam's characteristics along its propagation path. In particular, the space-beamwidth product, $M^2$, can be obtained in a single measurement. The irradiance and phase information can be used in concert with information about other elements in the optical train to predict the beam size, shape , phase and other characteristics anywhere in the optical train.

As in the '620 application, which is hereby incorporated by reference, the characteristics of the system are compensated for by applying a reference beam and subtracting any errors present in the characterization of the reference beam due to the system from subsequent characterization. This reference beam may be either a continuous wave beam or a pulsed beam. When applying the reference beam, the synchronization is only required when the reference beam is a pulsed beam. For example, a reference beam having known characteristics, typically a plane wave, is delivered through the lenslet array onto the detector. The known characteristics of the reference beam are then compared with the characterization output from the wavefront sensor. Any differences between the expected output and the actual output are then compensated for.

Setting the position of the lens equal to the lenslet focal length produces the smallest spot size, allowing the largest dynamic range on the sensor. Methods for calibrating the distance between the lenslet array and the detector are set forth in the '620 application, which are hereby incorporated by reference. These same methods may be applied to the wavefront sensor of the present invention. Preferably, a calibration beam has a wavefront with curvature and/or tilt, and may be either a pulsed beam or a cw beam, again with the synchronization being required only when the calibration beam is pulsed.

The analysis of the output of the wavefront sensor of the present invention is the same as for the '620 application, which is hereby incorporated by reference, except there is now an integration period for which data are acquired, as set by the synchronization of the data acquisition with the pulsing of the beam. The delay of the start of the synchronization period is set such that the pulsed beam is incident on the detector when the detector is acquiring data.

Figure 1:
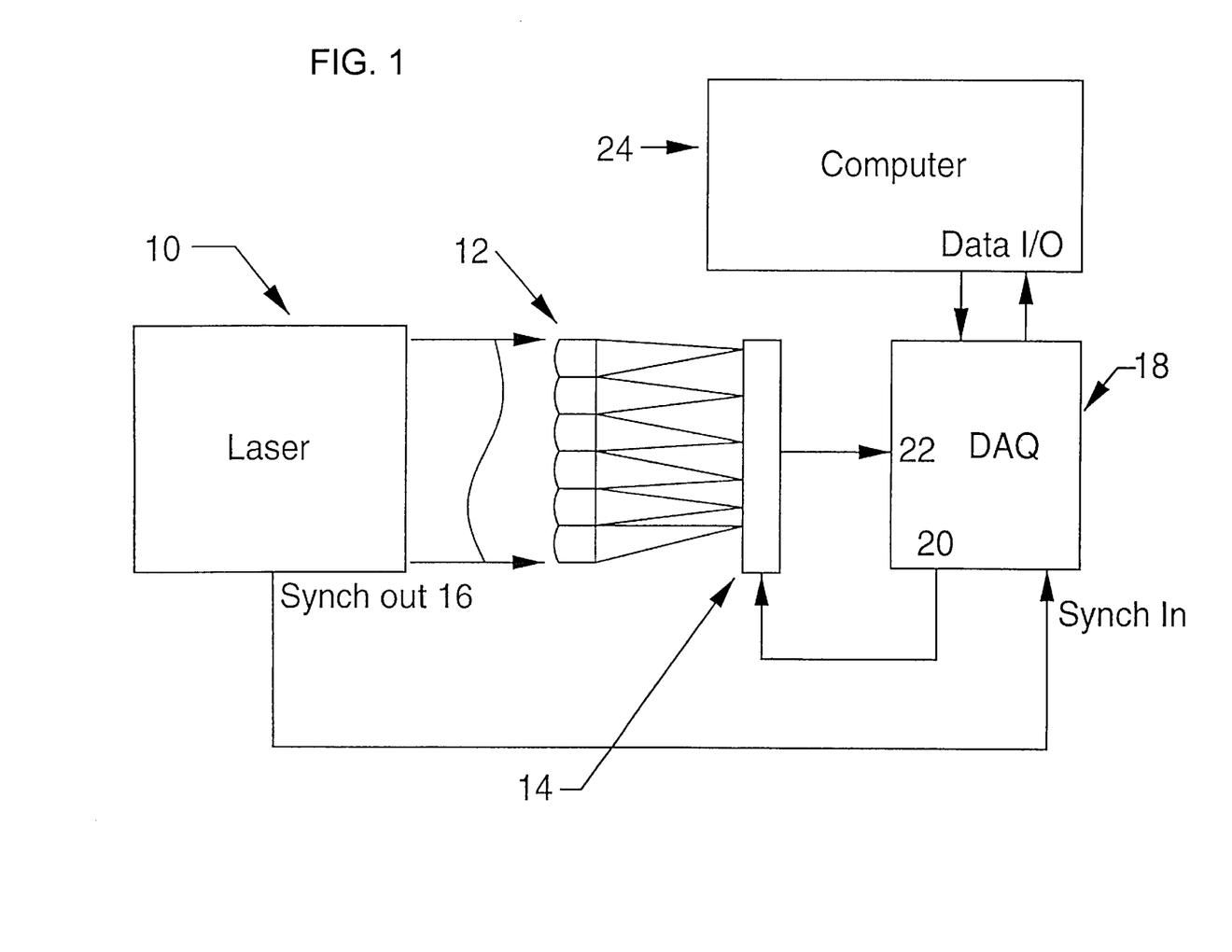
FIG. 1 is a schematic of a pulsed laser wavefront sensor layout showing synchronization paths in accordance with the present invention.

A schematic of the characterizing system of the present invention is shown in FIG. 1. A light source or laser 10 outputs the pulsed beam to be measured. The laser 10 produces laser light that is incident upon the sensor or detector array 14 through the lenslet array 12. The laser 10 also outputs an electronic signal 16, which is used to trigger the data acquisition, detector and other electronics. The data acquisition electronics 18 is used to acquire the data from the detector array. The data acquisition electronics 18 issues an electronic synchronization signal 20 to the detector 14 causing the detector 14 to begin light integration for a period of time. After this integration time has been completed, the detector system outputs the information to the data acquisition electronics 18 through signal cable 22, which may be either an analog or digital connection. The data acquisition electronics then transfers the information to the computer 24, which then is used to analyze the electronic information to provide characteristics of the beam.

Lenslet Array

The lenslet array 12 is used to divide the incoming light from the laser 10 into a number of small samples. The light from each of these samples is focused by the lenslet to create a focal spot on the detector array 14 for each of the samples. Each sample provides a unique focal spot, due to the full fill factor of the lenslet array. Since light travels in a straight line, the position of these focal spots is related to the direction of propagation of the light sampled by each lenslet. Since the optical wavefront is, by definition, the surface normal to the direction of propagation, the propagation direction is also the local wavefront slope. The wavefront can be determined by spatial integration of a number of these local slope measurements.

Detector Array or CCD Camera

The detector array 14 is a regular grid of detectors that may be individually read out by the data acquisition electronics 18. Several different existing systems may perform this function including, but not limited to, CCD cameras, CID cameras, staring array detectors, IR detectors, line scan cameras and diode arrays. Furthermore, the detector electronics must be arranged such that all pixels are sensitive to light simultaneously. This requires the use of progressive scan or frame transfer cameras. Conventional interlaced detector arrays have reduced usefulness because only every other line of the detector is sensitive to light at the same time. The camera or detector array also must have appropriate data acquisition interface electronics designed for synchronizing the detector to an external source, discussed below. Either analog or digital cameras may be used. However, the synchronization is typically simpler with an all digital system.

Thus, the timing parameters of the detector must be capable of arbitrary reset upon receipt of an external signal, for the present invention, from the laser 10. The optimum camera system should begin collecting light immediately upon receipt of the synchronization signal, and have a built in electronic shutter to minimize the effects of background light. The shutter will most likely be longer than the pulse being measured, but this does not interfere with the measurement as long as the shutter time is short enough to minimize the effect of the background light. Commercial cameras are available that either have these capabilities, or can be modified to have them. Timing delay between receipt of a trigger signal by the camera and beginning of light integration may be acceptable if the laser can issue a trigger signal prior to actual laser pulse emission. This is typical for many lasers. Alternatively, it may be necessary to externally trigger both the laser and the detector.

Data Acquisition Interface Electronics

The data acquisition electronics sends and receives the appropriate trigger and synchronization signals, acquires and digitizes data from the camera, and transfers this data to either on board or host computer memory 24. The data acquisition electronics may receive either digital or analog data from the detector array 14, and preferably is software controllable for integration with the rest of the sensor components. Several commercial frame grabbers exist that have these basic capabilities, and these can be used (in some cases with modification for the desired synchronization) to perform these functions.

Without this synchronization, background illumination would prevent the measurement of the beam characteristics in a single pulse, since this background light would be incident on the pixels even when the beam was not present. By collecting data substantially only when the pulse is incident on the sensor, background light may be virtually eliminated. Further, without this synchronization, the pulse could not be reliably captured. If a non-synchronized camera was used, e.g. a camera having a 30 Hz exposure frequency, the pulsed energy beam would only occasionally coincide with the image capture of the camera, providing information only intermittently and erratically.

Computer

The computer 24 is used to control the acquisition and analysis process, store the information, analyze the results, present graphical and digital data to the user, and send processed information to other devices for other uses. The computer may be one of several commonly available computers, or it could be a special purpose, dedicated system.

One commonly used parameter for characterizing laser beam quality is the space-beamwidth product, or $M^2$ parameter. The $M^2$ parameter is defined by:

$$M^2 = 4\pi\sigma_0\sigma_s$$

where $\sigma_0$ is irradiance weighted standard deviation at the waist position $Z_0$ and $\sigma_s$ is the spatial-frequency standard deviation of the beam. Note that $\sigma_s$ is not a function of z, and can be obtained using the Fourier transform of the electric field.

To calculate $M^2$ from discrete irradiance and phase measurements requires appropriate processing of the data by the computer. The present invention provides three exemplary methods of equal validity, dependent upon experimental parameters such as instrument noise, resolution, and dynamic range, or dependent upon wavefront and irradiance distribution characteristics. The three methods may be summarized as gradient method, curvature removal method, and multiple propagation method, and are next discussed. Further details of these methods are provided in the '620 application, which are all hereby incorporated by reference.

Gradient Method. It is possible to obtain a discrete description of the beam electric field amplitude and phase in a given plane normal to the z-axis. From the Shack-Hartmann sensor, the distribution of irradiance, and wavefront slope are obtained. From these distributions, a scalar representation of the electric field is calculated. The spatial-frequency electric field distribution is derived using a Fourier transform algorithm, such as the fast Fourier transform (FFT). From these the irradiance distributions in both domains, are obtained, whence numerical values for the variances, are calculated. The waist location is calculated from a combination of the irradiance and slope distributions.

Curvature Removal Method. The $M^2$ of a laser beam is completely independent of its overall curvature. Hence, performing an operation on the beam that affects its curvature will not affect the resultant value of $M^2$. Many previous methods for measuring $M^2$ depend on this fact, in that a weak focusing lens is introduced, and the second moment of the beam measured at differing Z locations. The weak lens is used to assure that all of the light arrives at the detector and to reposition the beam waist such that measurements are made near this waist. In general, this gives the best sensitivity to the measurement process.

Since a Shack-Hartmann wavefront sensor gives a complete measure of the irradiance and phase distribution of the light, the same operation can be performed without using a physical lens. Wavefront curvature may be added or subtracted from the digitally stored irradiance and phase distribution without affecting the $M^2$ of the beam. This operation can then be performed as part of the numerical process of determining $M^2$, without need to introduce a physical beam.

To compute $M^2$, information at the waist is needed. The waist is that plane that has infinite effective radius of curvature. With a wavefront sensor, measurements may be made at a location other than the waist. It is somewhat difficult to construct the location of the waist, and hence determine the second moment at the waist. In the gradient method, this was the primary object: to use the gradient information (also produced by the wavefront sensor) to compute the location and size of the waist, so that $M^2$ can be determined. However, since wavefront curvature has no affect on the $M^2$ calculation, an artificial waist can be created by removing the average curvature from the beam. This can be done by fitting the wavefront to a polynomial with second order terms. These second order terms are related to the radius of curvature of the real beam. The wavefront corresponding to the fit can then be subtracted out of the data, and the $M^2$ value computed, where the measurement plane is also the waist plane.

This method, referred to as the curvature removal method, has several advantages. It is simple to implement, and requires a minimum of calculations to determine $M^2$. The calculation of $M^2$ does not rely on determination of the waist plane or the waist size, and is thus somewhat less sensitive to noise or other errors. However, often these are desirable parameters as well. Hence additional calculations are needed to calculate the waist distance and size.

Since the irradiance and phase of the beam is known at an arbitrary plane, and the radius of curvature of the real beam was determined in order to remove curvature from the beam, all of the information is available that is needed for determining the waist size and location. The real beam can be propagated (numerically) back to the waist. This gives a complete description of the beam at both the waist and the measurement planes and a calculation of $M^2$.

One disadvantage of this method is that the calculation of waist size and location depend upon the $M^2$ calculation. As long as an accurate value of $M^2$ has been obtained, then these values are also accurate. However, it has been shown that $M^2$ is extremely sensitive to noise far from the laser beam center, and from truncation of the field at the edge of the detector. In this case the inaccurate $M^2$ values will also lead to inaccurate waist size and location values. In this respect the gradient method is better. The waist location is determined by the wavefront and wavefront gradients directly. Truncation or other errors will not have a strong effect of the waist size and location, although they will still affect $M^2$ because of the second order moment calculation.

Fourier Propagation Method. Given a known irradiance and phase of the laser beam, the beam irradiance and phase distribution may be determined at another plane, Z, through the Fresnel integral. This expression may be discretized and the discrete Fourier Transform (or Fast Fourier Transform, FFT) used to calculated the results. It has been shown that the Fast Fourier Transform is an efficient algorithm which can be readily implemented on common computers. This efficient algorithm allows the scalar E field to be calculated at a new Z location very quickly.

Since the field can be determined at a new Z location, it is also straightforward to calculate the field at a number of locations, Z. The irradiance distribution is calculated from the field as shown previously. The second order moment of the irradiance distribution can be calculated from the field at each of these locations. Thus, the values of $M^2$, $W_0$ and $Z_0$ can be determined.

This method, referred to as the Fourier propagation method, has several advantages. It does not calculate any of the parameters with better accuracy than the others, as in the curvature removal method. All of the parameters are determined from the basic propagation of the light itself. It is also more independent of the irradiance distribution. Thus, the defining equations are extremely simple and robust. However, this method does rely on an accurate Fourier propagation. This can be difficult because of sampling, aliasing, and guard band issues. These problems are mitigated through care in the design of the propagation algorithm, and because the integrals are generally performed for the least stressing case, i.e., for propagation over long distances or near the focus of a simulated lens. It may be advantageous to add a simulated lens to the calculation. In that case the first phase factor cancels out, and minimum aliasing occurs. It should also be noted that, since the wavefront gradients are also known, an appropriate grid may be selected algorithmically so that aliasing and other effects can be minimized.

Example of Pulsed Beam Measurement

As an example of reduction to practice of the present invention set forth herein, a flashlamp-pumped, neodymium-doped yttrium-aluminum-garnet (Nd:YAG) laser, e.g., Big Sky Model CFR-100, was measured. The laser was operated with a doubling crystal to produce light with a wavelength of 532 nm, with typically a pulse length of 6 ns. The laser provided a synchronization pulse which was used, with an appropriate delay to compensate for the difference between the start of the flashlamp and the start of the output of the laser, to trigger the detector and frame grabber electronics.

For this specific example, a wavefront sensor was constructed using a micro-optic lenslet array with 8.189 mm focal length and 0.144 mm diameter lenslets. A digital Cohu model 6612 camera was used with an Epix PIXCI-D frame grabber to acquire the data. The acquired data was analyzed using the WaveFront Sciences, Inc. CLAS-2D control and analysis program. This system provided a total resolution of 44×33 samples across the detector aperture. The camera was set to a short exposure time, e.g., $\frac{1}{10,000}$ sec., to minimize the effects of background light. Using the appropriate delay, the pattern of focal spots was recorded from a single laser pulse.

Figure 3:
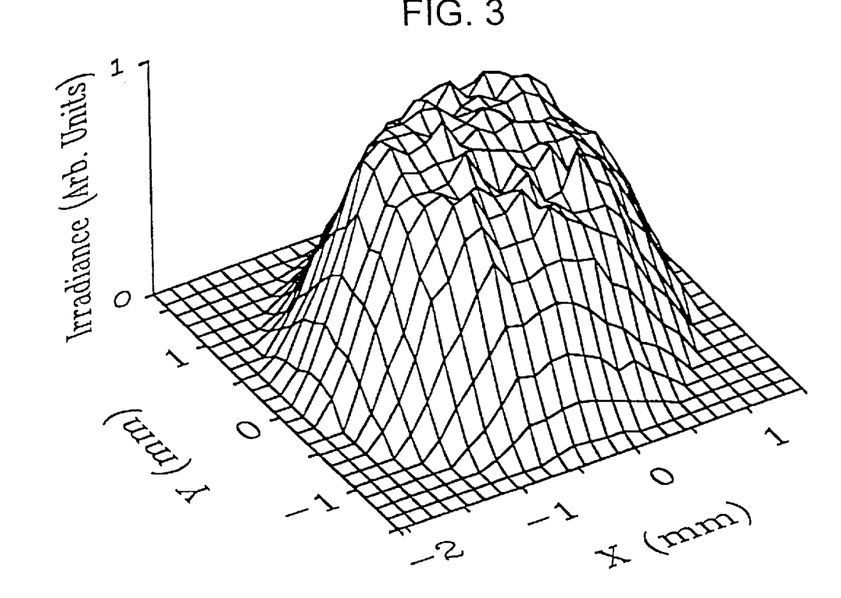
FIG. 3 is the intensity distribution for a single laser pulse.
Figure 4:
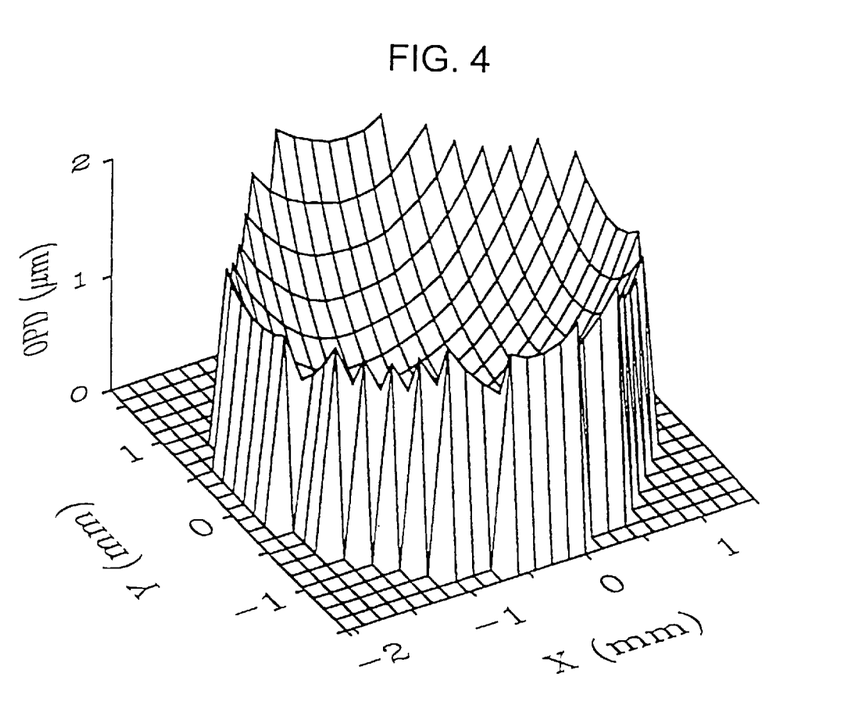
FIG. 4 is the wavefront distribution for a single laser pulse.

This pattern provided the essential information to construct the irradiance and wavefront distributions. FIG. 3 shows the intensity distribution and FIG. 4 shows the wavefront distribution for a single one of these laser pulses. Since this information was collected and analyzed from a single pulse, and the full irradiance and phase distributions are therefore known, all of the laser beam propagation characteristics are entirely known. Thus, the methods of the '620 application can be applied to determine the space beam-width product, beam divergence, spot size, waist location and size, Strehl ratio and other parameters of interest. Some of these parameters are presented below in Table 1.

TABLE 1

| Parameter | RMS | P-V |
|---|---|---|
| Wavefront error ($\mu$m) | 0.837 | 5.26 |
| Wavefront error (waves) | 1.33 | 8.30 |

| Parameter | X | Y |
|---|---|---|
| Spot radius (mm) | 0.65 | 0.57 |
| $M^2$ | 15.6 | 18.2 |
| Waist location (m) | −0.24 | −0.18 |
| Waist radius (mm) | 0.32 | 0.37 |
| Beam divergence (mr) | 3.89 | 3.33 |

Figure 5:
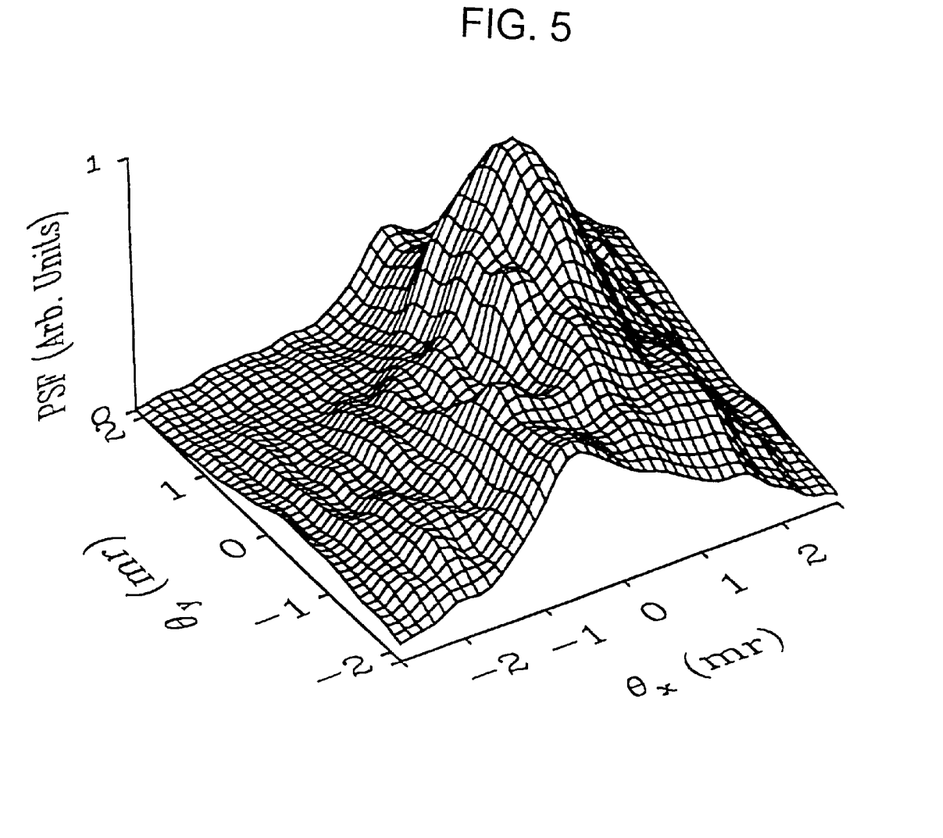
FIG. 5 illustrates the beam shown in FIGS. 3 and 4 having been numerically propagated to infinity.

Using the measured irradiance and phase distribution to describe the complex field, the irradiance distribution can be numerically calculated at a different plane, either upstream or downstream of the laser. An example of such a calculation for the beam measured in FIGS. 3 and 4 is shown in FIG. 5. In this case the beam was propagated numerically to infinity. This represents the far-field energy distribution for the laser beam. This is an important measure of the quality and usefulness of the laser beam. This particular laser beam pulse being characterized has significant divergence and aberrations, and does not focus very well.

It is important to establish that an accurate measure of the laser pulse can be obtained. To this end, a series of pulses has been measured for a statistical comparison. For this verification, a digital wavefront sensor was constructed using a Cohu 6612 10-bit digital camera and 2.047 mm focal length, 0.072-mm diameter lenslet array. This resulted in 88×66 resolution across the detector. The pixel size for this camera is 9.9 $\mu$m square. An expanded laser beam was used to overfill the aperture of the wavefront sensor to provide a fairly uniform irradiance distribution. Then, a sequence of pulses was acquired using the pulsed wavefront. This measurement resulted in a series of stored images of the lenslet array focal spot patterns. The images were acquired in rapid succession to minimize fluctuations in the focal spot pattern caused by laser or optical system perturbations. The sequence of images was then analyzed using the CLAS-2D analysis program developed by WaveFront Sciences, Inc.

A key statistical parameter for determining the performance of the sensor system is the variation of focal spot positions as determined by the centroid algorithm. To determine the statistical fluctuations, the pattern of focal spots from the first pulse in the sequence is used as a reference and subtracted from the computed centroid positions of each of the spots in successive frames. A figure of merit for each image was constructed as the irradiance weighted RMS spot position error:

$$\rho_{x,RMS}^2 = \frac{\sum_N I_l(\rho_{x,l} - \rho_{x,l}^{ref})^2}{\sum_N I_l} \text{ and } \rho_{y,RMS}^2 = \frac{\sum_N I_l(\rho_{y,l} - \rho_{y,l}^{ref})^2}{\sum_N I_l}$$

where $I_l$ is the irradiance distribution and $p_l$ is the calculated centroid position in x and y coordinates for each focal spot in the image. Irradiance weighting is used to account for irradiance variations within each image. The magnitude and fluctuations of these parameters are an extremely good figure of merit for the sensor performance, since they indicate the precision and stability of the measurements.

Figure 6:
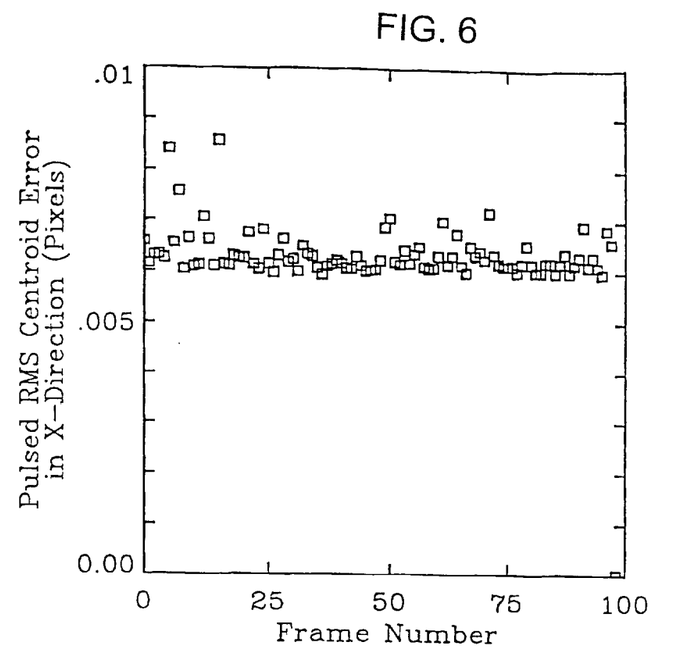
FIG. 6 shows the centroid estimation error in the x-direction for a sequence of pulses.
Figure 7:
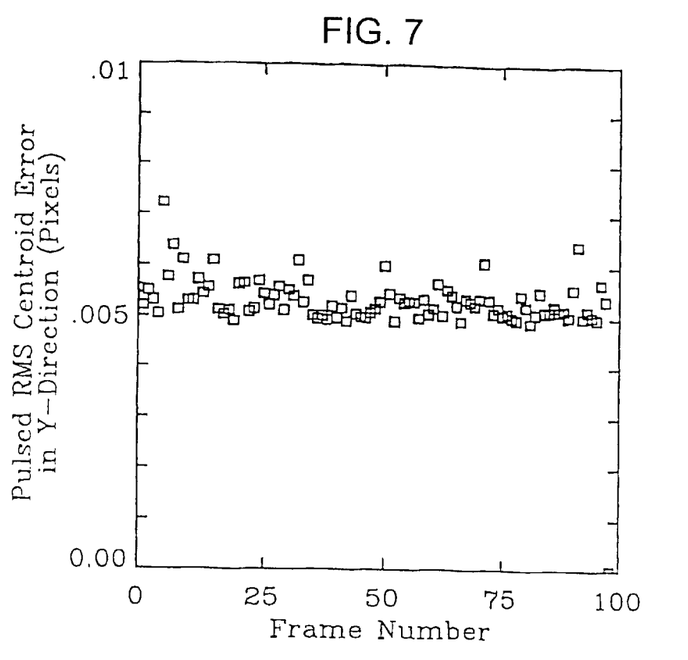
FIG. 7 shows the centroid estimation error in the y-direction for a sequence of pulses.

In FIGS. 6 and 7, the centroid estimation error is presented for the sequence of images for the pulsed beam for the x- and y-directions. The centroid estimation error is expressed in fractions of a pixel. It can be seen from these figures that the average centroid estimation error is ~0.0063 pixel (x) and ~0.0053 pixel (y) for pulsed wavefront sensor operation. This provides for extremely accurate wavefront measurements, having better than $\lambda/100$ repeatability.

Figure 8:
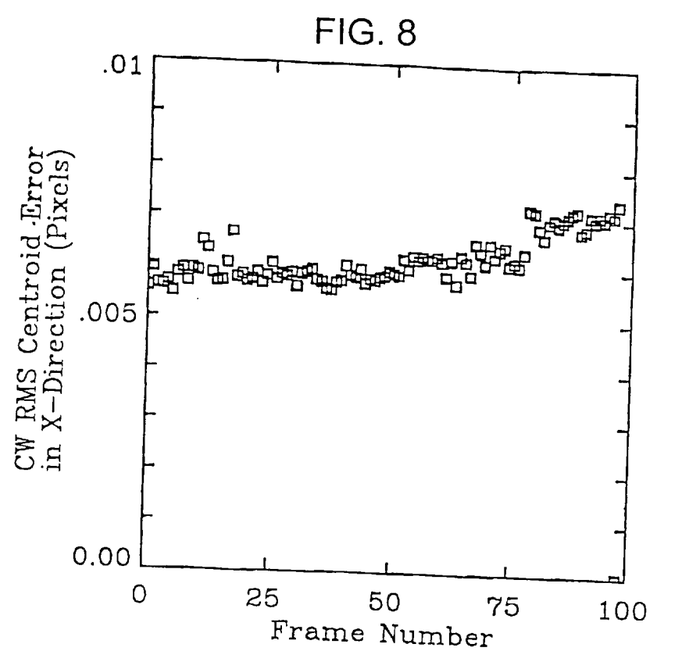
FIG. 8 shows the centroid estimation error in the x-direction for a continuous wave beam.
Figure 9:
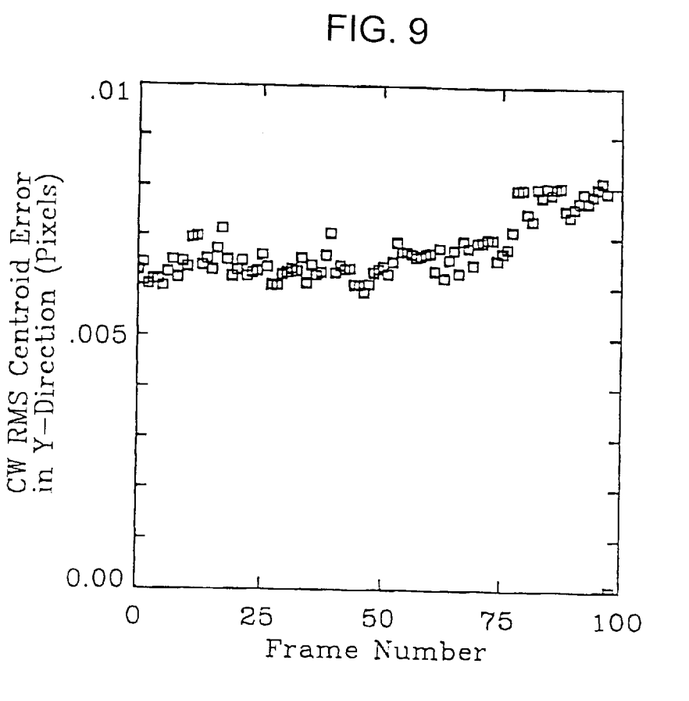
FIG. 9 shows the centroid estimation error in the y-direction for a continuous wave to beam.

For comparison, a similar experiment was conducted with a similar wavefront sensor operating in cw mode, such as the one disclosed in the '620 application. For the cw measurement, an 8.189-mm focal length, 0.144-mm diameter lenslet array was used to give 44×33 resolution across the camera aperture. Since the Big Sky laser operates only in pulsed mode, an expanded HeNe laser was used for the measurements. FIG. 8 shows the x- and FIG. 9 shows the y-centroid estimation error for a sequence recorded from a cw beam. In this case the average centroid estimation error was ~0.0061 (x) and ~0.0067 (y). The slight difference in centroid estimation error between the pulsed case and the cw case is not due to the difference in pulsed versus cw performance, but to the difference in lenslet array and laser source.

These measurements illustrate that the wavefront sensor in accordance with the present invention can be used in pulsed mode with similar accuracy to that of a cw system.

Thus, the present invention allows both the amplitude and phase of a pulsed beam to be characterized in a single measurement by synchronizing the data acquisition with the pulse of the beam. In particular, the $M^2$ parameter can be obtained from the collected data from a single pulse.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

What is claimed is:

1. A device for measuring the phase and irradiance distribution of a pulsed light beam in a single pulse comprising:
   a lenslet array dividing the pulsed light beam into samples into a plurality of spots;
   a detector having shutter timing thereof controlled in accordance with a synchronization pulse from a source of the pulsed light beam, the detector converting a pattern of the spots into electronic signals;
   data acquisition electronics synchronized to the source and the detector, said data acquisition electronics integrating the electronic signals from the detector for a single pulse from the source; and
   a computer receiving integrated electronic signals from the data acquisition electronics and computing characteristics of the pulsed light beam in the single pulse.

2. The device in claim 1, wherein the device is used to measure a train of pulses in succession.

3. The device in claim 1, wherein the computer further determines laser beam quality and space-beamwidth product from the data.

4. The apparatus of claim 2, wherein the computer further determines the space-beamwidth product using a gradient calculation.

5. The apparatus of claim 2, wherein the computer further determines the space-beamwidth product using a curvature removal calculation.

6. The apparatus of claim 2, wherein the computer further determines the space-beamwidth product using a Fourier propagation calculation.

7. The apparatus of claim 1, wherein said lenslet array is rigidly mounted directly in front of said detector.

8. The apparatus of claim 1, wherein a distance between the lenslet array and the detector is known and is used by the computer for computing characteristics for the pulsed light beam.

9. The apparatus of claim 8, wherein the distance is determined by using a known optically induced wavefront characteristic selected from the group consisting of curvature and tilt.

10. The apparatus of claim 1, further comprising a source providing a reference beam and said computer determines one or more spot positions of the reference beam incident on the apparatus.

11. The apparatus of claim 1, wherein said detector is a digital camera.

12. The apparatus of claim 1, wherein said detector is an analog detector.

13. A method for simultaneously determining features of a pulsed light beam in a single pulse comprising:
   dividing the single pulse into a plurality of spots;
   delivering the spots as focal spots on a detector, the detector converting the spots to electronic signals;
   controlling a shutter of the detector in accordance with a synchronization signal from a source outputting the pulsed light beam;
   integrating the electronic signals from the detector for the single pulse; and
   determining, from the integrated electronic signals for the single pulse, an irradiance and a phase of the pulsed light beam.

14. The method of claim 13, further comprising calculating a space-beamwidth product of the pulsed light beam.

15. The method of claim 14, wherein the calculating a space-beamwidth product comprises using a gradient method calculation.

16. The method of claim 14, wherein the calculating a space-beamwidth product comprises using a curvature removal method calculation.

17. The method of claim 14, wherein the calculating a space-beamwidth product comprises using a Fourier propagation method calculation.

18. The method of claim 13, further comprising rigidly mounting the lenslet array directly in front of the detector.

19. The method of claim 13, further comprising calibrating the method including determining a distance between a lenslet array dividing the single pulse and the detector.

20. The method of claim 19, wherein the calibrating comprises comparing against a known optically induced wavefront characteristic selected from the group consisting of curvature and tilt.

21. The method of claim 13, further comprising generating a reference beam and computing one or more spot positions of the reference beam.

22. The method of claim 13, further comprising repeating said dividing, delivering, controlling, integrating and determining for a train of pulses in succession.

* * * * *